United States Patent [19]

Riggs et al.

[11] 4,215,674

[45] Aug. 5, 1980

[54] RADIANT ELECTROMAGNETIC ENERGY COLLECTOR

[75] Inventors: Roger E. Riggs; Michael D. Shell, both of Reston, Va.

[73] Assignee: Thermal Dynamics, Inc., Reston, Va.

[21] Appl. No.: 907,207

[22] Filed: May 18, 1978

[51] Int. Cl.$^2$ ............................................. F24J 3/02
[52] U.S. Cl. .................................... 126/438; 126/443
[58] Field of Search ............... 126/270, 271; 237/1 A; 60/641; 350/293, 299, 296, 289, 288, 295; 165/163

[56] References Cited

U.S. PATENT DOCUMENTS

| | | | |
|---|---|---|---|
| 2,664,275 | 12/1953 | Carter | 165/163 |
| 3,153,878 | 10/1964 | Smith, Jr. | 350/295 |
| 3,310,102 | 3/1967 | Trombe | 126/270 |
| 4,002,499 | 1/1977 | Winston | 126/270 |
| 4,030,477 | 6/1977 | Smith | 126/271 |
| 4,099,517 | 7/1978 | McRae | 126/271 |

Primary Examiner—James C. Yeung
Attorney, Agent, or Firm—Shlesinger, Arkwright, Garvey & Dinsmore

[57] ABSTRACT

A radiant electromagnetic energy collector has an elongated non-imaging concentrator which concentrates and directs radiant energy onto an elongated absorber having a helical conduit for a heat exchange fluid mounted in an evacuated glass tube. The concentrator has rounded ends which also function as concentrating surfaces to concentrate and direct radiant energy onto the ends of the absorber. The helical conduit within the evacuated tube is connected to input and output pipes leading to the exterior of the tube which pass through a seal situated within the cylinder formed by the helical coil. The collector has a flexible transparent cover which is stretched to a flat sheet and held in position by an interengaging channel and locking rod arrangement located about the periphery of the concentrator.

15 Claims, 8 Drawing Figures

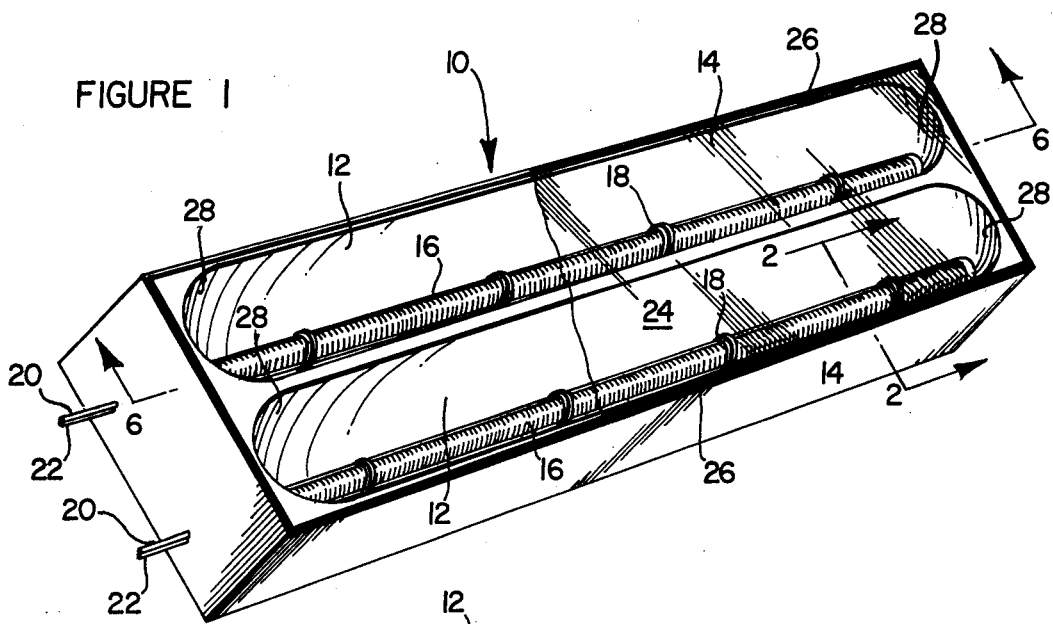
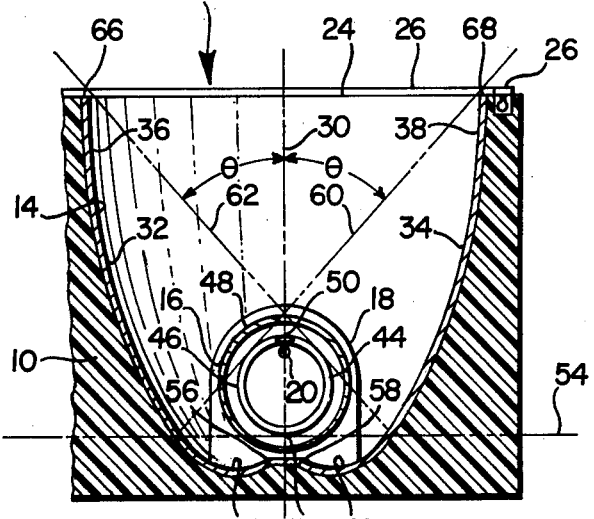
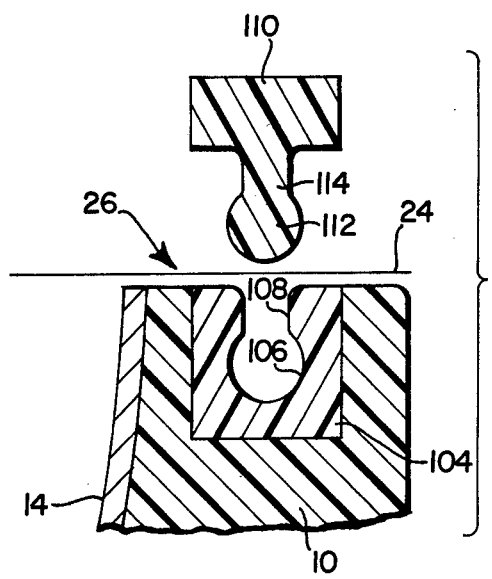
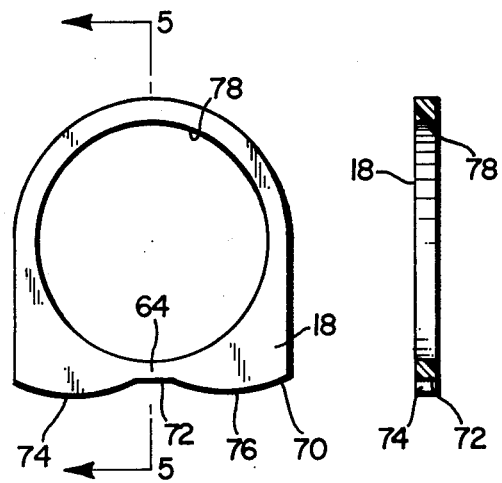
FIGURE 1
FIGURE 2
FIG. 3
FIGURE 4
FIGURE 5

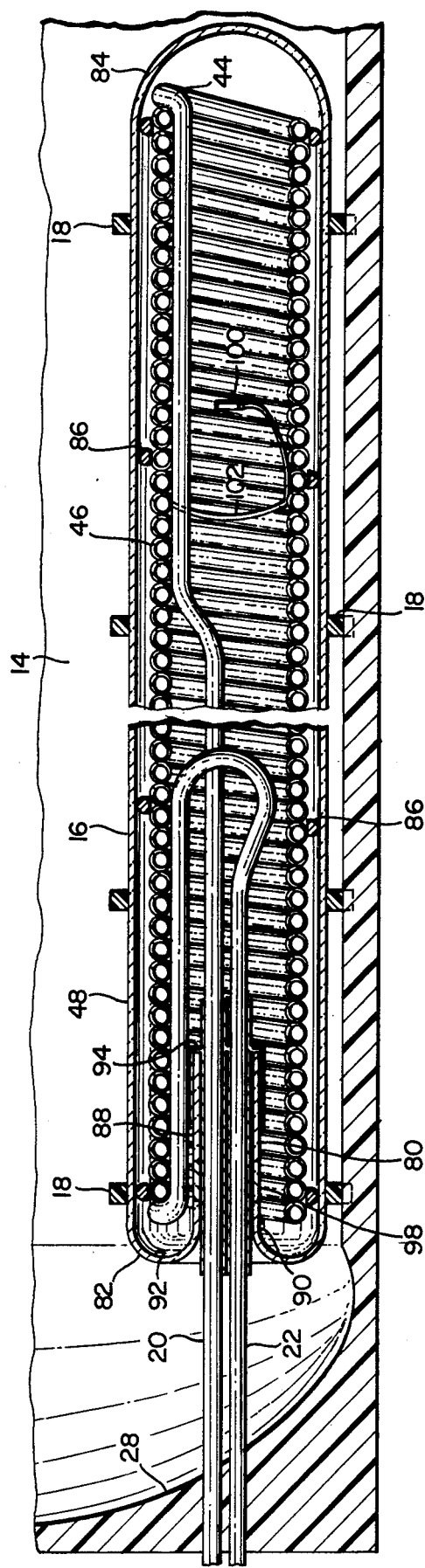

RADIANT ELECTROMAGNETIC ENERGY COLLECTOR

BACKGROUND OF THE INVENTION

This invention is directed to the field of radiant electromagnetic energy collectors, particularly those for collecting solar energy.

A large amount of interest has evolved in recent years over the use of solar energy as an alternative energy source. Among the problems encountered in the design of radiant energy collectors has been the need for a reflecting and concentrating system which can efficiently collect radiant energy from a wide range of directions thus avoiding the necessity for complicated tracking gear to readjust the facing of the energy collector as the sun traverses the sky during the day and as the sun's height in the sky changes with the seasons. Such a design is disclosed in U.S. Pat. No. 4,002,499 to R. Winston. The Winston design has an additional advantage in that it is a non-imaging system which operates efficiently to concentrate both specular and diffuse radiation and thus provides an advantage in hazy weather when much of the solar radiation is scattered and beam radiation is at a minimum.

Another important factor in collector design concerns the absorber which must absorb as much incident radiation as possible while keeping heat loss due to reradiation, convection and conduction to a minimum. A very efficient absorber design for achieving these goals has a helically coiled pipe coated with a radiation absorbing surface positioned in an evacuated glass tube. A heat exchange fluid in the pipe absorbs incident radiation while the coating keeps reradiation to a minimum and the evacuated space prevents heat loss due to convection and conduction. Such a heat absorber has not been proposed for use with a non-imaging concentrator, however.

An area in the design of elongated trough-like radiant energy collectors which has received little attention involves the end portions of the energy concentrator. The ends are typically simply cut off and closed off with a flat plate which serves no concentrating function. This is a disadvantage for a solar collector trough oriented with its longitudinal axis on an East-West axis since the sun is usually not projecting its rays at a perpendicular angle with respect to the longitudinal axis. Thus it is most often the situation that an energy absorber equal in longitudinal length to the concentrator will have concentrated rays directed onto only one of its end portions while the incident rays at the opposite end of the trough will be reflected and concentrated towards an area on the absorber longitudinally displaced from the absorber end. Thus the entire length of the absorber will not be utilized. If the end plates are opaque they present an added disadvantage in that at different times of the day one or the other of them will cast a shadow on the absorber.

SUMMARY OF THE INVENTION

A purpose of this invention, therefore, is to provide a radiant electromagnetic energy collector which will achieve high energy concentration and absorption with low energy loss through reradiation, conduction and convection and which will require no solar tracking.

A purpose of this invention is to achieve a more efficient radiant energy collector through the use of an evacuated tube absorber containing a helically coiled fluid conduit with a non-imaging radiant energy concentrator.

Another purpose of the invention is to provide an elongated, trough-like energy collector having end portions with surface areas which actively participate in concentrating radiant energy and directing it onto an energy absorber thus making more efficient use of the overall length of the absorber by avoiding the use of end portions with no concentrating function which would result in the utilization of only a portion of the absorber's overall length at any given time.

A further purpose of this invention is to provide an elongated trough-like energy collector which makes more efficient use of its absorber's length through the use of end portions which extend beyond the ends of the energy absorber and actively participate in concentrating radiant energy and directing it onto the energy absorber thus permitting the use of an energy absorber shorter than the length of the concentrator.

A purpose of the invention is to provide an elongated trough-like energy collector with an evacuated tube energy absorber containing a helically coiled heat exchange fluid conduit in which the seal assembly through which the input and output pipes enter the evacuated tube is located within the cylinder formed by the helical coil thus avoiding a bulky longitudinally extending appendage on one end of the evacuated tube and permitting more efficient use of the longitudinal length of the energy collector in concentrating and absorbing energy.

A purpose of the invention is to provide in a trough-like energy collector an evacuated tube energy absorber for use with a concentrator having concentrating end portions, the absorber tube containing a working absorbing element for its entire length.

A further purpose of this invention is to provide a trough-like energy collector having a thin flexible transparent cover which is stretched flat across the top of the collector and held in place by an interengaging channel and locking rod arrangement located about the periphery of the concentrator.

A further purpose of the invention is to provide an energy collector composed of resin materials wherever possible to cut down on weight, to eliminate corrosion problems and to provide a unit made with less expensive materials.

The above objects are achieved by a radiant electromagnetic energy collection device comprising an elongated energy absorber and an elongated energy concentrator, the absorber being an evacuated tube containing a helically coiled conduit for a heat exchange fluid and the concentrator being a non-imaging reflecting and concentrating element having a cross-sectional configuration symmetrical about a longitudinally extending first reference plane which passes through the center of the cylinder defined by the helically coiled conduit.

The concentrator may have concentrating end portions so that its surfaces are grouped into three sections, the first of which coextends with the absorber from one end of the absorber to the other and the second and third sections of which each form an end portion defined by rotating the half of the first section's cross-sectional configuration on either side of the first reference plane 180° about an axis lying in the first reference plane adjacent a respective end of the absorber.

The absorber tube has a seal assembly through which the input and output pipes enter the evacuated tube, the seal assembly being located within the helical coil cylinder and comprising a cylinder formed by an inwardly inverted extension of one of the tube ends. The inwardly inverted cylinder has a diameter smaller than the diameter of the helical coil cylinder and is longitudinally disposed within the inner space defined by the helical coil cylinder with a first end connected to the tube end and a second end having a seal thereon. The input and output pipes pass through the sealed second end and extend longitudinally with respect to the tube and the inwardly inverted cylinder. The inverted cylinder may have at least one thermal expansion transition area. The absorber is positioned relative to the concentrator by at least two supports each of which is made from a material which transmits radiant energy.

The device may have a cover of a thin flexible radiation-transmissive material which is stretched flat across the top of the collector and held in place by an interengaging channel and locking rod arrangement located about the periphery of the concentrator.

Resin materials are used in the device wherever possible such as in the body of the device and for the absorber supports, the cover and the interengaging channel and locking rod arrangement.

BRIEF DESCRIPTION OF THE DRAWINGS

FIG. 1 is a perspective view of a radiant electromagnetic energy collector unit according to this invention partially broken away to show more clearly the energy concentrators and absorbers;

FIG. 2 is an enlarged fragmentary sectional view taken along the line 2—2 of FIG. 1 and viewed in the direction of the arrows;

FIG. 3 is an enlarged exploded sectional view of the interengaging channel and locking rod arrangement about the periphery of the concentrators which holds the collector cover;

FIG. 4 is a front elevational view of a support used to position the absorber relative to the concentrator;

FIG. 5 is a sectional view taken along the line 5—5 of FIG. 4 and viewed in the direction of the arrows;

FIG. 6 is an enlarged longitudinal fragmentary sectional view showing the absorber and taken substantially along the line 6—6 of FIG. 1;

FIG. 7 is an enlarged longitudinal fragmentary sectional view of the end of the absorber having a seal assembly; and FIG. 8 is an enlarged cross-sectional view taken along the line 8—8 of FIG. 7 and viewed in the direction of the arrows.

DETAILED DESCRIPTION

Referring to FIG. 1, a unit 10 has two radiant electromagnetic energy collectors 12 contained therein. While two collectors 12 are shown, the body of the unit 10, which is a single casted piece of reinforced resin material made by a process to be discussed hereinafter, may contain any number of collectors 12. Each energy collector 12 has a radiant electromagnetic energy concentrator 14 which reflects and concentrates incident radiant energy into a radiant electromagnetic energy absorber 16. Each energy absorber 16 is positioned in its concentrator 14 by a series of at least two supports 18. Heat exchange fluid enters each absorber 16 through an inlet pipe 20 where it is heated by the absorbed radiant energy and subsequently removed through an output pipe 22.

In order to keep the surfaces of each concentrator 14 clean and to prevent outdoor debris from collecting in each energy collector 12 the collector unit 10 has a cover 24 which is anchored about the periphery of the collector unit 10 by an interengaging channel and locking rod arrangement 26.

Each concentrator 14 is a cavity made in the unit 10 during the casting process which is subsequently coated or laminated with a composition which will provide a reflective surface. This coating or lamina may be applied directly to the reinforced resin substrate if it is compatible therewith. If not, then one or more intermediate layers providing compatibility may be used. In addition a protective top coat may be applied to the reflective surface. The various coatings or laminates may be applied by appropriate techniques. While the composition of the reflective coating or lamina is not critical and may be any reflective heat stable material, a silver composition applied by a spray plating method is preferred. To prevent oxidation and degradation of this silver reflective surface, it is coated with a polymethylsiloxane composition.

The concentrator 14 is in the shape of an elongated channel or trough the surface of which has three sections. The first section begins at one end of the energy absorber 16 and coextends longitudinally with the absorber 16 ending at the opposite end of the absorber 16. The first section has a constant cross-sectional configuration throughout its length. The second and third sections of the concentrator 14 are continuous extensions of the first section. Each extends beyond the end of the absorber 16 and forms a curved end portion 28 to the concentrator 14.

The configuration of the first section of the concentrator 14 is that of a non-imaging concentrator such as that disclosed in U.S. Pat. No. 4,002,499, issued to R. Winston, the disclosure of which is herein incorporated by reference. Such a configuration responds to both direct beam radiation and diffuse radiation thus directing all incident radiation to the energy absorber 16. The energy absorber 16, which is generally cylindrical in shape, is bisected by a first reference plane 30 which passes through the center of the absorber 16. The concentrator 14 has a cross-sectional configuration which is symmetrical about this longitudinally extending first reference plane 30 thus defining a first side wall 32 on one side of the plane 30 and a second side wall 34 on the opposite side of the plane 30. Each side wall has a first portion 36, 38 and a second portion 40, 42. The absorber 16 contains a heat absorbing element which is a conduit 44 arranged for part of its length as a helical coil 46 extending longitudinally through the absorber 16. The helical coil 46 defines a cylinder which is concentric with respect to the cylindrical absorber tube housing 48. Each second portion 40, 42 of each side wall 32, 34 has the shape of a portion of the involute of the one half of the helical coil cylinder 46 on its side of the first reference plane 30. The involute of each half of the helical coil cylinder 46 is formed as follows. An imaginary thread is fastened to the helical coil cylinder 46 at fixed point 50 which is on the reference plane 30. The imaginary thread is wrapped around one side of the helical coil cylinder 46 with its end point at starting point 52. Point 52 which is also on the first reference plane 30 has a second reference plane 54 passing therethrough which is tangent to the helical coil cylinder 46 and perpendicular to the first reference plane 30. The locus of the end point of the imaginary thread as it is unwrapped from the helical coil cylinder 46 is in the involute of that side of the helical coil cylinder 46. Each second side wall portion 40, 42 coincides with that portion of its involute extending from a point 56, 58 spaced from the starting point 52 to the shadow lines 60, 62 of the helical coil cylinder 46. The points 56, 58 are spaced from the starting point 52 so that there may be room between the helical coil cylinder 46 and the second side wall portions 40, 42 for the absorber tube housing 48 and, at intervals along the absorber 16, a support 18. With a modified support 18 not having a central base area 64 or with a support 18 partially recessed into the surface of the concentrator 14, the second side wall portions 40, 42 may begin at the absorber tube housing 48.

The shadow line 60, 62 for each of the side walls 32, 34 is defined as the line which crosses the first reference plane 30 at a point on the same side of the second reference plane 54 as the helical coil cylinder 46 at an angle $\theta$ and which is tangent to the helical coil cylinder 46 on the same side of the first reference plane 30 as its respective side wall 32, 34. $\theta$ is the maximum angle from the first reference plane 30 at which all radiant electromagnetic energy crossing the first reference plane 30 from either side is directed into the helical coil cylinder 46 by either the first side wall 32 or the second side wall 34.

The first portion 36, 38 of each of the side walls 32, 34 is an extension of its respective second portion 40, 42 from the shadow lines 60, 62 to terminal points 66, 68. Each first portion 36, 38 is shaped so that all radiant electromagnetic energy crossing the first reference plane 30 from either direction at the angle $\theta$ and striking any point on either of the first portions 36, 38 is directed along a line tangent to the helical coil 46. The terminal points 66, 68 are the points at which tangents to the side walls 32, 34 are parallel to the first reference plane 30.

The second and third sections 28 of the energy concentrator 14 each have a configuration which will concentrate and reflect radiant energy toward the end of the absorber 16 adjacent that section of the concentrator 14. The second and third section 28 configuration is defined by rotating the half of the cross-sectional configuration of the first section to either side of the first reference plane 30 180° about an axis lying in the first reference plane 30 adjacent one of the ends of the absorber 16 and perpendicular to the second reference plane 54.

The energy absorber 16 is positioned relative to the surfaces of the concentrator 14 by at least two supports 18. The number of supports 18 actually used will vary depending on the length of the absorber 16. Each support 18 has a base surface 70 in three sections: a central section 72 which forms the base of the central base area 64 and, to either side of the central section 72, first and second outside areas 74, 76 each of which conforms to the cross-sectional configuration of one of the second side wall portions 40, 42. Each support 18 has a central cylindrical opening 78 through which the absorber 16 is mounted. The absorber supports 18 should be composed of a material which permits the transmission of radiant energy so that the full length of the absorber 16 is exposed to radiant energy. For this reason the tube supports 18 are preferably fabricated from light transmissive methyl methacrylate resins which are inherently stable to ultraviolet radiation. Each support 18 is mechanically fastened to the body 10 of the collector by using threaded nylon studs and bolts (not shown).

The absorber 16 consists of an evacuated glass tube housing 48 which must be made from a glass material having the characteristics of high radiant energy transmission, high temperature stability and the strength to maintain a high vacuum. For these reasons a borosilicate glass composition is preferred. The glass tube 48 is in the shape of an elongated cylinder having a vacuum seal assembly 80 at one end 82 and a dome 84 at its opposite end. Contained within the glass tube 48 is a fluid conduit 44 for conducting heat exchange fluid through the absorber 16. To absorb as much energy as possible, the conduit 44, as previously described, is arranged for part of its length as a helical coil 46 which stretches from end to end of the glass tube cylinder 48 and is concentric therewith. The helical coil 46 is spaced from contact with the tube walls throughout the length of the tube 48 by means of spacing elements 86. The conduit 44 is preferably made with copper tubing electroplated with a black coating such as a chromium oxide coating to enhance its energy absorption and to prevent reradiation. Heat exchange fluid is conducted into and removed from the conduit 44 by input pipe 20 and output pipe 22 which pass between the interior and the exterior of the absorber 16 through the seal assembly 80.

Since it is necessary in order for the ends 82, 84 of the absorber 16 to be able to receive radiant energy from the end portions 28 of the concentrator 14 that the helical coil 46 extend as nearly as possible to the very end of each end 82, 84 of the tube 48, the seal assembly 80 cannot be situated as a longitudinal appendage on the tube 48. In such a location it would interfere with the concentrating function of the end portion 28 to which it is adjacent. Consequently the seal assembly 80 is situated in the inner space bounded by the helical coil 46. The tube end 82 has an inwardly inverted cylindrical extension 88 substantially within this inner space with a diameter smaller than the diameter of the helical coil. This inverted cylinder 88 is longitudinally disposed with its axis substantially parallel to the axis of the helical coil 46 and has a first end 90 immediately adjacent the tube end 82 to which it is connected by a curved portion 92 and a second end 94 longitudinally spaced from the tube end 82 having a seal thereon. The metal of the pipes 20, 22 is joined to the glass of the inwardly inverted cylinder 88 by a glass-metal sealing composition 96 which preserves the vacuum of the absorber 16. The input and output pipes 20, 22 pass through the second end 94 of the inwardly inverted cylinder 88 and extend longitudinally with respect to the tube 48 and the inwardly inverted cylinder 88 out through the concentrator 14 and the body of the unit 10. To prevent the differing coefficients of expansion of the metal tubing and the inwardly inverted glass cylinder 88 from breaking the seal during heat up and cool down of the absorber 16 the inwardly inverted cylinder 88 has at least one area consisting of a transition glass material 98 with a coefficient of thermal expansion compatible with the glass tube 48 and the metal of the pipes 20, 22. The pipes 20, 22 may be potted with silicone rubber for shock protection where they emerge from the tube 48.

Also situated in the inner space bounded by the helical coil 46 is a getter 100 mounted on a metal support 102. Getter 100 is activated with a radiant energy source rather than with a microwave source which would require locating the getter outside of the helical coil 46 in a longitudinal extension of the tube 48.

The vacuum maintained by the tube 48 in addition to preventing heat loss through conduction and convection prevents any synthetic resin elements of the collector sensitive to extreme heat from being heated.

Covering the trough-like cavity formed by a collector 12 is a protective cover 24 made from a thin flexible radiant energy transmissive material which may be a resin material. The preferred material is an ultraviolet light stabilized polyester film having a five mil thickness. The cover 24 is stretched taut over the collector unit 10 and held in position by the interengaging channel and locking rod arrangement 26 which is situated about the periphery of the unit adjacent the terminal points 66, 68 of the concentrator side walls 32, 34. The channel and locking arrangement 26 includes a resilient channel member 104 adhesively anchored in the body 10 of the collector unit. The channel member 104 has a hollow cylindrical interior area 106 and a hollow neck area 108 connecting the cylindrical interior area 106 to the surface of the channel member 104. the neck area 108 is smaller in cross-section than the cylindrical area 106. The locking rod 110 which engages the channel member 104 is made from a resilient material and has a cylindrical area 112 and a neck area 114 conforming to the dimensions of the cylindrical interior area 106 and the neck area 108 of the channel member 104 whereby the locking rod 110 may engage and be held in position by the channel member 104. In operation the flexible cover 24 is placed between the channel member 104 and the locking rod 110 so that when they are pressed into engagement the cover 24 is pinched between them and thereby held in position. The channel member 104 and the locking rod 110 may be composed of a resin material. Preferably the channel member 104 and the locking rod 110 are made from ethylene propylene diene monomer which is stable to radiant electromagnetic energy. The channel member 104 may be anchored in the body 10 with a silicone composition.

The collector 12 may be used, for instance, to heat water up to 300° F. and thus may be used to produce low pressure steam. If it is desired to keep the water liquid, the conduit 44 and input and output pipes 20, 22 may be operated under pressure which may be regulated by an appropriate pressure valve system. The collector 12 of this invention therefore has potential for both residential and industrial use.

While the body of the unit 10 has been shown as having a generally rectangular configuration outside of the collector area, the body of the unit 10 may be of any shape and structure which will provide support for the surface of the concentrator 14 and be of as light a weight as possible and which will be compatible with the structure upon which the unit 10 is to be mounted.

The body of the unit 10 is a single casted piece of reinforced resin material the preferred composition of which is a combination of general purpose polyester resins and a reinforcing material. This reinforcing material is a combination of milled short-length fiberglass strands and a hybrid mixture of mineral particles of various shapes, sizes and densities. The mineral particles include mica flakes of high aspect ratio (i.e., length to thickness) in the order of 150 to one which add tensile and modulus strength to the composition. Also included are solid and hollow glass spheres which increase the compressive strength of the composition and provide for better stress distribution while lightening the weight of the overall composition. The other mineral particles serve to reduce the amount of resin needed while regulating the viscosity of the mixture. A fiberglass-hybrid mineral-polyester resin system offers the advantages of lightweight, heat resistance and resistance to ultraviolet degradation.

While traditional methods such as pressure molding for fabricating molded reinforced plastic articles may be used to produce the body 10 of the collector, the size of the unit would require large steel molds and a large hydraulic press to manipulate the mold halves. A more economical and therefore preferred method for fabricating the body 10 of the collectors 12 is biaxial rotation casting. In this process the master mold, rather than being metal, is fabricated using fiberglass laminating cloth and polyester resin from a plaster master of the body 10. The two halves of this relatively light reinforced resin master mold are then mounted in a device which rotates the mold about both lateral and longitudinal axes. The effect of this biaxial rotation is the development of centrifugal forces inside the mold's cavity which spread unpolymerized polyester resin, milled fiberglass and hybrid mineral introduced into the mold throughout the mold cavity. By using a high speed catalyst, the curing time can be lowered to 15 minutes or less.

While this invention has been described as having a preferred design, it will be understood that it is capable of further modification. This application, is, therefore, intended to cover any variations, uses, or adaptations of the invention following the general principles thereof and including such departures from the present disclosure as come within known or customary practice in the art to which this invention pertains, and as may be applied to the essential features hereinbefore set forth and fall within the scope of this invention of the limits of the claims.

What is claimed is:

1. A radiant electromagnetic energy collection device, comprising:
   an energy absorbing means including an evacuated tube containing a conduit for a heat exchange fluid, said conduit arranged for part of its length as a helical coil extending longitudinally through said tube and forming a cylinder in said tube; and
   an energy concentrating means for directing and concentrating radiant electromagnetic energy onto said absorbing means,
   said concentrating means having a reflective surface, said reflective surface having a cross-sectional configuration symmetrical about a longitudinally extending first reference plane which passes through the center of said energy absorbing means and said helical coil, said first reference plane defining a first side wall of said reflective surface on one side of said first reference plane and a second side wall of said reflective surface on the opposite side of said first reference plane;
   said helical coil having a second reference plane tangent to said helical coil with said second reference plane perpendicular to said first reference plane so that said helical coil extends along said first reference plane from said second reference plane;
   each of said walls having first and second portions, said second portion of each of said side walls having the shape of a portion of the involute of one half of said helical coil and extending from a point spaced from the point of tangency of said helical coil with said second reference plane to the shadow lines of said helical coil, the shadow line for each of said side walls being defined as the line which crosses said first reference plane at a point on the same side of said second reference plane as said helical coil at an angle $\theta$ and which is tangent to said helical coil on the same side of said first reference plane as its respective side wall;

said first portion of each of said side walls being an extension of said second portion of each of their respective side walls and extending from each of their respective shadow lines to respective terminal points, $\theta$ being the maximum angle from said first reference plane at which all radiant electromagnetic energy crossing said first reference plane from either direction is directed into said helical coil by either said first side wall or said second side wall, said first portion of each of said side walls being shaped so that all radiant electromagnetic energy crossing said first reference plane from either direction at said angle $\theta$ and striking any point on said respective first portions is directed along a line tangent to said helical coil, said terminal points being the points at which tangents to said side walls at said terminal points are parallel to said first reference plane.

2. The device of claim 1 and including at least two supports positioning said evacuated tube so that said helical coil is situated with said first reference plane passing through the center of said helical coil and said second reference plane tangent to said helical coil with said second reference plane perpendicular to said first plane, each of said supports having a base surface conforming to said cross-sectional configuration and a central cylindrical opening therethrough through which said tube is mounted.

3. The device of claim 2 wherein each of said supports is composed of a resin material which transmits and is stable against radiant electromagnetic energy.

4. The device of claim 1 and wherein said energy concentrating means has adjacent each of said terminal points of said side walls a resilient channel member with a cylindrical interior area and a neck area connecting said cylindrical interior area to the surface of said channel member, said neck area being smaller in cross-section than said cylindrical interior area; said device including a flexible radiant electromagnetic energy transmissive cover; and a resilient locking rod having a cylindrical area and a neck area conforming to the dimensions of said cylindrical area and said neck area of said channel member whereby said locking rod may engage said channel member with said cover pinched between said locking rod and said channel member to hold said cover in a flat configuration stretched across said energy concentrating means.

5. The device of claim 4 wherein said device has a body of reinforced resin material and said channel member, said locking rod and said cover are composed of resin materials.

6. The device of claim 1 wherein said device has a body of reinforced resin material.

7. A radiant electromagnetic energy collection device, comprising:
an energy absorbing means having longitudinally spaced ends;
an energy concentrating means for directing and concentrating radiant electromagnetic energy onto said absorbing means and having three sections each having a reflective surface;
the first of said three sections longitudinally coextending with said absorbing means from end to end of said absorbing means;
said reflective surface of said first section having a cross-sectional configuration symmetrical about a longitudinally extending first reference plane which passes through the center of said energy absorbing means;
the second and third of said three sections each being a continuous extension of said first section and each forming an end portion at opposite ends of said first section;
each of said reflective surfaces of said second and third sections having a configuration defined by rotating the half of said cross-sectional configuration on either side of said first reference plane 180° about an axis lying in said first reference plane adjacent one of the ends of said energy absorbing means; and,
said device having a body of reinforced resin material.

8. The device of claim 7 wherein said energy absorbing means includes:
an evacuated tube containing a conduit for a heat exchange fluid, said conduit arranged for part of its length as a helical coil extending longitudinally through said tube, said helical coil forming a cylinder and defining an inner space within said helical coil; and
means for conducting heat exchange fluid into and out of said conduit, said conducting means passing between the exterior and the interior of said tube adjacent one end of said tube, said conducting means being situated within said inner space so that said helical coil may extend longitudinally to the very end of said tube at which said conducting means is located.

9. The device of claim 7 wherein the reinforcing material in said reinforced resin material comprises a mixture of fiberglass and mineral particles.

10. The device of claim 9 wherein said mineral particles include mica flakes.

11. The device of claim 9 wherein said mineral particles include glass spheres.

12. A radiant electromagnetic energy collection device, comprising:
an energy absorbing means having longitudinally spaced ends;
an energy concentrating means for directing and concentrating radiant electromagnetic energy onto said absorbing means and having three sections each having a reflective surface;
the first of said three sections longitudinally coextending with said absorbing means from end to end of said absorbing means;
said reflective surface of said first section having a cross-sectional configuration symmetrical about a longitudinally extending first reference plane which passes through the center of said energy absorbing means;
the second and third of said three sections each being a continuous extension of said first section and each forming an end portion at opposite ends of said first section, each of said reflective surfaces of said second and third sections having a configuration defined by rotating the half of said cross-sectional configuration on either side of said first reference plane 180° about an axis lying in said first reference plane adjacent one of the ends of said energy absorbing means;

said energy absorbing means including an evacuated tube containing a conduit for a heat exchange fluid, said conduit arranged for part of its length as a helical coil extending longitudinally through said tube, said helical coil forming a cylinder and defining an inner space within said helical coil;

means for conducting heat exchange fluid into and out of said conduit, said conducting means passing between the exterior and the interior of said tube adjacent one end of said tube, said conducting means being situated within said inner space so that said helical coil may extend longitudinally to the very end of said tube at which said conducting means is located;

said tube end adjacent said conducting means having an inwardly inverted cylindrical extension with a diameter smaller than the diameter of said helical coil, said cylindrical extension being longitudinally disposed substantially within said inner space defined by said helical coil and having a first end immediately adjacent said tube end connected to the remainder of said tube by a curved portion and a second end longitudinally spaced from said tube end and having a seal thereon; and, said conducting means including an input pipe for conducting heat exchange fluid to said conduit and an output pipe for conducting heat exchange fluid out from said conduit, said input and output pipes passing through said sealed second end of said inwardly inverted cylindrical extension and extending longitudinally with respect to said tube and said cylindrical extension.

13. The device of claim 12 wherein said conduit and said input and output pipes are metal, said tube is glass and said inwardly inverted cylindrical extension has at least one thermal expansion transition area.

14. A radiant electromagnetic energy collection device, comprising:

an energy absorbing means having longitudinally spaced ends;

an energy concentrating means for directing and concentrating radiant electromagnetic energy onto said absorbing means and having three sections each having a reflective surface;

the first of said three sections longitudinally coextending with said absorbing means from end to end of said absorbing means;

said reflective surface of said first section having a cross-sectional configuration symmetrical about a longitudinally extending first reference plane which passes through the center of said energy absorbing means;

the second and third of said three sections each being a continuous extension of said first section and each forming an end portion at opposite ends of said first section;

each of said reflective surfaces of said second and third sections having a configuration defined by rotating the half of said cross-sectional configuration on either side of said first reference plane 180° about an axis lying in said first reference plane adjacent one of the ends of said energy absorbing means; and, said first reference plane defining a first side wall of said reflective surface of said first section on one side of said first reference plane and a second side wall of said reflective surface of said first section on the opposite side of said first reference plane;

said energy absorbing means having a second reference plane tangent to said absorbing means and perpendicular to said reference plane so that said absorbing means extends along said first reference plane from said reference plane;

each of said side walls having first and second portions, said second portion of each of said side walls having the shape of a portion of the involute of one half of said absorbing means and extending from a point spaced from the point of tangency of said absorbing means with said second reference plane to the shadow lines of said absorbing means, the shadow line for each of said side walls being defined as the line which crosses said first reference plane at a point on the same side of said second reference plane as said absorbing means at an angle $\theta$ and which is tangent to said absorbing means on the same side of said first reference plane as its respective side wall;

said first portion of each of said side walls being an extension of said second portion of each of their respective side walls and extending from each of their respective shadow lines to respective terminal points, $\theta$ being the maximum angle from said first reference plane at which all radiant electromagnetic energy crossing said first reference plane from either direction is directed into said absorbing means by either said first side wall or said second side wall, said first portion of each of said side walls being shaped so that all radiant electromagnetic energy crossing said first reference plane from either direction at said angle $\theta$ and striking any point on said respective first portions is directed along a line tangent to said absorbing means, said terminal points being the points at which tangents to said side walls at said terminal points are parallel to said first reference plane.

15. A radiant electromagnetic energy collection device, comprising:

an energy absorbing means having longitudinally spaced ends and including a conduit for a heat exchange fluid;

means for conducting heat exchange fluid into and out of said conduit and into and out of said device;

an energy concentrating means for directing and concentrating radiant electromagnetic energy onto said absorbing means and having three sections each having a reflective surface;

the first of said three sections longitudinally coextending with said absorbing means from end to end of said absorbing means;

said reflective surface of said first section having a longitudinally constant cross-sectional configuration symmetrical about a longitudinally extending first reference plane which passes through the center of said energy absorbing means;

the second and third of said three sections each being a continuous extension of said first section and each forming an end portion at opposite ends of said first section; and, each of said reflective surfaces of said second and third sections having a configuration defined by rotating the half of said cross-sectional configuration on either side of said first reference plane 180° about an axis lying in said first reference plane adjacent one of the ends of said energy absorbing means.

* * * * *